(12) United States Patent
Ikenishi et al.

(10) Patent No.: US 8,261,579 B2
(45) Date of Patent: Sep. 11, 2012

(54) OPTICAL GLASS, PRECISION PRESS-MOLDING PREFORM AND OPTICAL ELEMENT

(75) Inventors: Mikio Ikenishi, Akishima (JP); Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/351,298

(22) Filed: Jan. 17, 2012

(65) Prior Publication Data

US 2012/0111062 A1    May 10, 2012

Related U.S. Application Data

(62) Division of application No. 11/516,670, filed on Sep. 7, 2006, now Pat. No. 8,158,541.

(30) Foreign Application Priority Data

Sep. 14, 2005   (JP) .................. 2005-267547

(51) Int. Cl.
   *C03C 19/00* (2006.01)
   *C03C 3/23* (2006.01)
   *C03C 3/247* (2006.01)
   *C03C 3/17* (2006.01)
   *C03B 23/00* (2006.01)

(52) U.S. Cl. ......... 65/61; 65/54; 65/55; 501/43; 501/44; 501/48

(58) Field of Classification Search .............. 65/54, 55, 65/61; 501/30, 41, 44, 48
See application file for complete search history.

(56) References Cited

U.S. PATENT DOCUMENTS

| | | | |
|---|---|---|---|
| 3,492,136 A | 1/1970 | Bromer et al. | |
| 3,508,937 A | 4/1970 | Bromer et al. | |
| 3,656,976 A | 4/1972 | Izumitani et al. | |
| 3,671,276 A | 6/1972 | Bromer et al. | |
| 3,847,624 A | 11/1974 | Broemer et al. | |
| 4,120,814 A | 10/1978 | Izumitani et al. | |
| 4,973,345 A | 11/1990 | France | |
| 5,045,507 A | 9/1991 | Tran | |
| 5,068,209 A | 11/1991 | Meinert | |
| 5,242,868 A | 9/1993 | Hara | |
| 5,635,109 A | 6/1997 | Otsuka | |
| 7,595,272 B2 * | 9/2009 | Ikenishi et al. | 501/48 |
| 2003/0040421 A1 | 2/2003 | Margaryan | |
| 2004/0082460 A1 * | 4/2004 | Yamane et al. | 501/48 |
| 2004/0087428 A1 | 5/2004 | Otsuka | |
| 2005/0054511 A1 | 3/2005 | Fujiwara et al. | |

FOREIGN PATENT DOCUMENTS

| | | |
|---|---|---|
| EP | 0 709 345 A1 | 5/1996 |
| GB | 781243 | 8/1957 |
| GB | 2 083 454 A | 3/1982 |

(Continued)

*Primary Examiner* — Noah Wiese
(74) *Attorney, Agent, or Firm* — Nixon & Vanderhye P.C.

(57) ABSTRACT

Provided is an optically uniform and high-quality optical glass that is free from the occurrence of striae when a precision press-molding preform is produced therefrom, and that is a fluorine-containing glass having a refractive index $nd^{(1)}$ wherein the refractive index $nd^{(1)}$ and a refractive index $nd^{(2)}$ are substantially equivalent to each other, said refractive index $nd^{(2)}$ being a refractive index of the fluorine-containing glass after the fluorine-containing glass is re-melted in a nitrogen atmosphere at 900° C. for 1 hour, cooled to its glass transition temperature and then cooled to 25° C. at a temperature decrease rate of 30° C./hour.

6 Claims, 1 Drawing Sheet

FOREIGN PATENT DOCUMENTS

| | | |
|---|---|---|
| JP | 55-47243 | 4/1980 |
| JP | 2-204342 | 8/1990 |
| JP | 3-500161 | 1/1991 |
| JP | 3-500162 | 1/1991 |
| JP | 05-238775 | 9/1993 |
| JP | 7-157330 | 6/1995 |
| JP | 9-211505 | 8/1997 |
| JP | 2004-083290 A | 3/2004 |
| JP | 2004-137100 | 5/2004 |
| JP | 2005-82406 | 3/2005 |
| JP | 2005-82425 | 3/2005 |
| JP | 2005-353718 | 12/2005 |
| WO | WO 90/00159 | 1/1990 |

* cited by examiner

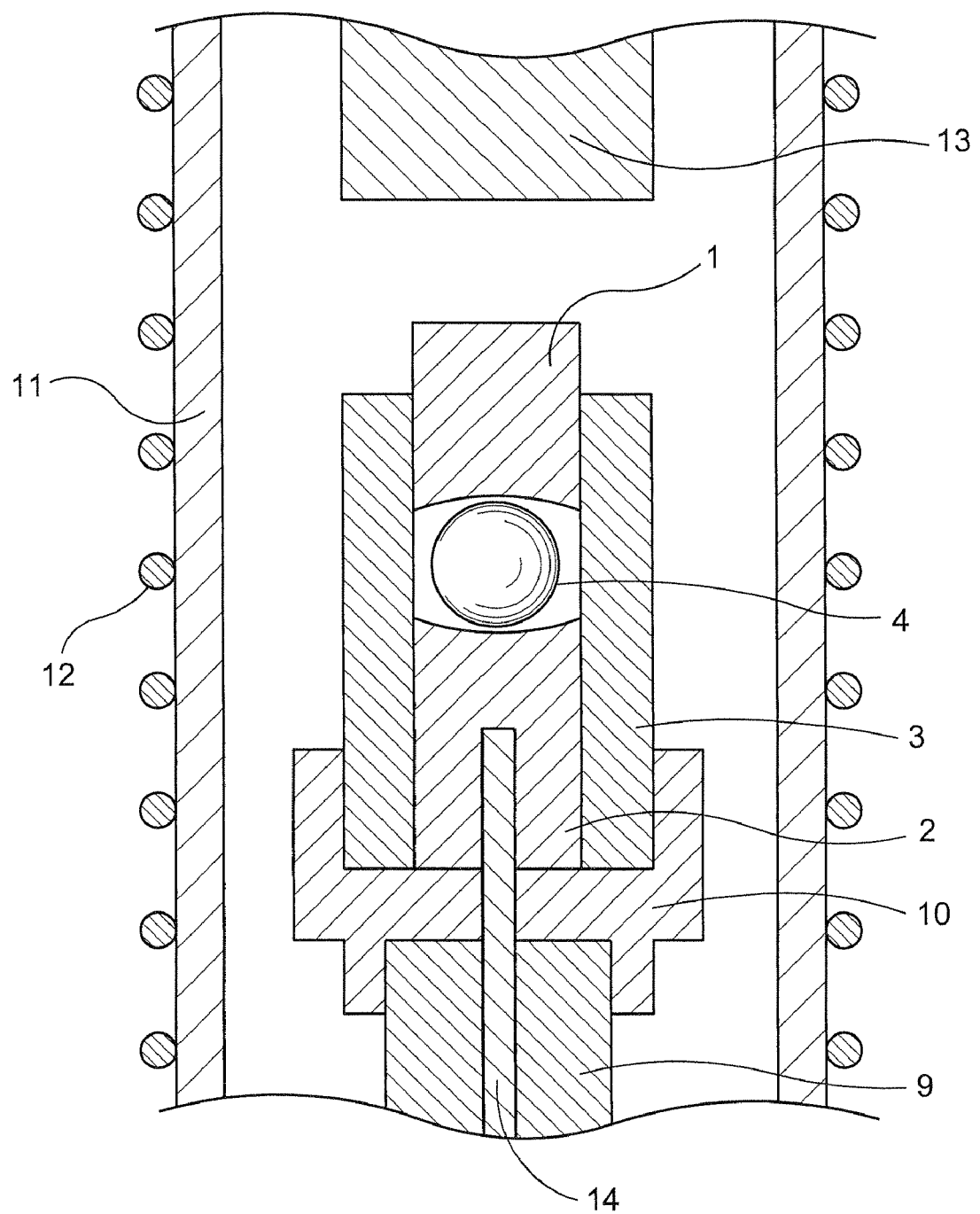

OPTICAL GLASS, PRECISION PRESS-MOLDING PREFORM AND OPTICAL ELEMENT

This application is a divisional of application Ser. No. 11/516,670 filed Sep. 7, 2006, now allowed, now U.S. Pat. No. 8,158,541 which in turn is a claims priority of JP 2005-267547 filed Sep. 14, 2005, the entire content of each of which is hereby incorporated by reference herein.

FIELD OF THE INVENTION

The present invention relates to an optical glass, a precision press-molding preform formed of the optical glass, a process for the production of the preform, an optical element formed of the optical glass and a process for the production of the optical element.

BACKGROUND ART

As a method for producing an optical element formed of a glass by press-molding without grinding or polishing, a precision press-molding is known. This method is a method in which optical elements that are not easily produced by grinding and polishing such as aspherical lenses, microlenses, diffraction gratings, etc., are highly productively mass-produced by accurately transferring the form of inner surface of a press mold to each glass material that is being molded.

The glass material to be molded by the precision press-molding method is called a preform, and it is a glass shaped material formed of a glass having a weight accurately equivalent to the weight of a press-molded product. When the steps from the melting of a glass up to the formation of an optical element are viewed as a series of process, the productivity of the process as a whole can be more improved if a preform can be shaped directly from a molten glass.

Meanwhile, a fluorine-containing glass such as fluorophosphate glass or the like is a very useful optical glass as a low-dispersion glass, and as this fluorophosphate optical glass, a glass as described in Japanese National Publication of Translated Version No. 3-500162 is known.

DISCLOSURE OF THE INVENTION

Problems to be Solved by the Invention

When a precision press-molding preform (to be sometimes referred to as "glass shaped material" hereinafter) is produced by heating and melting glass raw materials and shaping the obtained molten glass, a fluorine-containing glass such as the above conventional fluorophosphate glass causes the volatilization of fluorine in the glass through a high-temperature glass surface, so that a preform as an end product has an optically non-uniform portion called striae in a layer in the vicinity of the surface.

There is therefore involved a problem that the preform can be used as a material for producing an optical element only when the surface layer of the preform is removed by some method.

Further, apart from the production of the above preform, the shaping of a plate-shaped glass or a rod-shaped glass from a molten glass causes a like problem that a highly volatile substance volatilizes through a high-temperature glass surface to cause striae.

As described above, there has been a problem that when a fluorine-containing glass is produced by heating and melting glass raw materials, the optical uniformity of the glass is impaired.

The present invention has been made for overcoming the above problems. It is an object of the present invention to provide an optically uniform and high-quality fluorine-containing optical glass. Further, it is another object of the present invention to provide a precision press-molding preform formed of the above optical glass and a process for the production thereof. It is further another object of the present invention to provide an optical element formed of the above optical glass and a process for the production thereof.

Means to Solve the Problems

For achieving the above objects, the present invention provides the following (1) to (17).

(1) an optical glass that is a fluorine-containing glass having a refractive index $nd^{(1)}$, wherein the refractive index $nd^{(1)}$ and a refractive index $nd^{(2)}$ are substantially equivalent to each other, said refractive index $nd^{(2)}$ being a refractive index of the fluorine-containing glass after the fluorine-containing glass is re-melted in a nitrogen atmosphere at 900° C. for 1 hour, cooled to its glass transition temperature and then cooled to 25° C. at a temperature decrease rate of 30° C./hour.

(2) An optical glass as recited in the above (1), wherein the absolute value of $nd^{(2)} - nd^{(1)}$ is 0.00300 or less.

(3) An optical glass as recited in the above (1) or (2), wherein the fluorine-containing glass is a fluorophosphate glass.

(4) An optical glass as recited in the above (3), wherein the fluorophosphate glass comprises, by cationic %, 5 to 50% of $P^{5+}$,
0.1 to 40% of $Al^{3+}$,
0 to 20% of $Mg^{2+}$,
0 to 25% of $Ca^{2+}$,
0 to 30% of $Sr^{2+}$,
0 to 30% of $Ba^{2+}$,
0 to 30% of $Li^+$,
0 to 10% of $Na^+$,
0 to 10% of $K^+$,
0 to 10% of $Y^{3+}$,
0 to 5% of $La^{3+}$ and
0 to 5% of $Gd^{3+}$.

(5) An optical glass as recited in the above (3) or (4), wherein the molar ratio of content of $F^-$ to the total content of $F^-$ and $O^{2-}$, $F^-/(F^- + O^{2-})$, is from 0.25 to 0.95.

(6) An optical glass as recited in any one of the above (3) to (5), which contains 2 to 30 cationic % of $Li^+$.

(7) An optical glass as recited in any one of the above (1) to (6), which has a refractive index $nd^{(1)}$ of 1.40000 to 1.60000 and an Abbe's number (vd) of 67 or more.

(8) An optical glass as recited in the above (3), wherein the fluorophosphate glass contains $Cu^{2+}$.

(9) An optical glass as recited in the above (8), which comprises, by cationic %, 11 to 45% of $P^{5+}$,
0 to 29% of $Al^{2+}$,
0 to 43% of total of $Li^+$, $Na^+$ and $K^+$,
14 to 50% of total of $Mg^{2+}$, $Ca^{2+}$, $Sr^{2+}$, $Ba^{2+}$ and $Zn^{2+}$ and
0.5 to 13% of $Cu^{2+}$ and further comprises, by anionic %, 17 to 80% of $F^-$.

(10) An optical glass as recited in the above (1) or (2), wherein the fluorine-containing glass is a fluoroborate glass or fluorosilicate glass.

(11) A precision press-molding preform formed of the optical glass recited in any one of the above (1) to (10).

(12) A precision press-molding preform as recited in the above (11), whose entire surface is a surface formed by solidification of a glass surface in a molten state.

(13) A process for the production of a precision press-molding preform, which comprises causing a molten glass of the optical glass recited in any one of the above (1) to (10) to flow out, separating a molten glass gob and shaping the glass gob into the preform during the cooling of the glass.

(14) An optical element formed of the optical glass recited in any one of the above (1) to (10).

(15) A process for the production of an optical element, which comprises heating the precision press-molding preform recited in the above (11) or (12) or a precision press-molding preform obtained by the process recited in the above (13) and precision press-molding the precision press-molding preform in a press mold.

(16) A process for the production of an optical element as recited in the above (15), wherein the precision press-molding preform is introduced into the press mold and the precision press-molding preform and the press mold are heated together to carry out the precision press-molding.

(17) A process for the production of an optical element as recited in the above (15), wherein the precision press-molding preform heated separately is introduced into the press mold heated to carry out the precision press-molding.

Effect of the Invention

According to the present invention, there can be provided a fluorine-containing optical glass that is suitable for producing a high-quality precision press-molding preform from a molten glass and further that is suitable for producing an optical element by precision press-molding the thus-produced preform.

According to the present invention, further, there can be provided a precision press-molding preform formed of the above optical glass and a process for the production thereof, and there can be provided an optical element formed of the above optical glass and a process for the production thereof.

Further, there can be also provided an optical glass that does not much vary in optical properties such as a refractive index, etc., when it is melted and molded since the optical glass has the content of a volatile substance decreased.

BRIEF DESCRIPTION OF DRAWINGS

FIG. 1 is a schematic drawing of a precision press-molding apparatus used in Examples.

PREFERRED EMBODIMENTS OF THE INVENTION

When an attempt is made to produce a preform formed of a fluorine-containing glass such as a fluorophosphate glass by melting glass raw materials, intense volatilization takes place through the molten glass surface, and striae are caused in the vicinity of the preform surface due to the volatilization. When an easily volatile substance in a glass to be used for forming the preform is decreased by some means, it can be expected that the striae is overcome since the volatilization is suppressed. When the content of the easily volatile substance is decreased, the glass to be demanded may change in composition per se.

The present inventors have made studies for a method for overcoming the striae by decreasing the concentration of a volatile substance in a glass while a demanded glass composition is realized, and some pieces of knowledge have been obtained. Such pieces of knowledge of the present inventors' are as follows.

(1) It is considered that volatile substance and non-volatile substance are present in a molten glass obtained by melting glass raw materials under heat.

(2) The volatile substance in the glass is generated when the glass raw materials are melted under heat, and it is considered that the volatile substance is thereafter no longer generated or that the amount thereof is negligible as compared with the amount of the volatile substance generated when the raw materials are melted under heat even if such is generated.

(3) For decreasing the concentration of the volatile substance, it is sufficient to volatilize the volatile substance from a molten glass accumulated in a vessel. It is required to stop the glass from flowing out before the concentration of the volatile substance is fully decreased.

(4) A preform is produced by shaping the molten glass in which the concentration of the volatile substance is decreased, and the preform is gradually cooled and re-heated to melt it. In this case, it is considered that the concentration of the volatile substance does not increase since the glass formation from the raw materials is already completed by the initial melting. In effect, even when a glass in which the concentration of the volatile substance has been decreased as described above is re-melted, almost no volatilization is observed.

(5) It is not easy to ascertain whether or not the concentration of the volatile substance is decreased to a level at which the striae are sufficiently reduced. It is theoretically thinkable to employ a method in which a volatile substance is identified and measured for a concentration or a method in which a volatile substance that volatilizes from a re-melted glass is measured for an amount per unit volume of the glass and the ascertaining is made on the basis of the amount. However, these methods are not practical.

The glass of the present invention is fortunately an optical glass, and the refractive index is hence highly precisely determined.

The refractive index of the glass reflects its composition, and the refractive index changes with a change in the composition. A change in the concentration of the volatile substance means a very small change in the composition. In the optical glass of which the refractive index is highly precisely determined, however, such a very small change can be monitored by way of a change in the refractive index. For example, when a glass is measured for a refractive index before and after it is re-melted, and it follows that when a difference between the refractive index before the re-melting and the refractive index after the re-melting is large, a large amount of the volatile substance remains in the glass that is to be re-melted, and that when the above difference between the refractive indexes is small, the amount of the volatile substance is small.

(6) The difference between the refractive index before the re-melting and the refractive index after the re-melting is linked with the overcoming of the striae, and the refractive index before the re-melting and the refractive index after the re-melting are brought into substantial agreement, more specifically, the absolute value of the difference between the refractive index before the re-melting and the refractive index after the re-melting is made to be a certain value or less, whereby there can be provided an optical glass that can overcome the striae.

On the basis of the above inference, the present inventors have measured a glass for refractive indexes before and after the re-melting of the glass to determine a refractive index difference and arranged that the absolute value of the refractive index difference should be a certain value or less, whereby the striae found during the shaping of the glass were overcome.

The present invention will be specifically explained below.

[Optical Glass]

The optical glass of the present invention is a fluorine-containing glass having a refractive index $nd^{(1)}$, wherein the refractive index $nd^{(1)}$ and a refractive index $nd^{(2)}$ are substantially equivalent to each other, said refractive index $nd^{(2)}$ being a refractive index of the fluorine-containing glass after the fluorine-containing glass is re-melted in a nitrogen atmosphere at 900° C. for 1 hour, cooled to its glass transition temperature and then cooled to 25° C. at a temperature decrease rate of 30° C./hour.

That the above $nd^{(1)}$ and $nd^{(2)}$ are substantially equivalent to each other means that $nd^{(1)}$ and $nd^{(2)}$ approximate to each other such that an optical glass has no striae.

In the optical glass of the present invention, the absolute value of $nd^{(2)}-nd^{(1)}$ is preferably 0.00300 or less. When the absolute value of $nd^{(2)}-nd^{(1)}$ exceeds 0.00300, striae take place on the surface of a preform when a molten glass is shaped into the preform. When the above absolute value is 0.00300 or less, there can be provided a glass material that can prevent the occurrence of striae. The above absolute value is preferably in the range of 0.00200 or less, more preferably 0.00150 or less, still more preferably 0.00100 or less. In a fluorine-containing glass, fluorine is a component that relatively decreases the refractive index of the glass, so that the value of $nd^{(2)}-nd^{(1)}$ is generally positive.

As an atmosphere in which the re-melting is carried out for measuring $nd^{(2)}$, a nitrogen atmosphere is employed for preventing an influence on the refractive index of a glass based on a reaction between the glass and the atmosphere. The re-melting is carried out under predetermined conditions including a temperature of 900° C. and a time period for 1 hour, and then the re-melted glass is cooled to its glass transition temperature. Since the value of $nd^{(2)}$ is also influenced by a temperature decrease rate during the cooling, the cooling is carried out at a predetermined temperature decrease rate of 30° C./hour and the re-melted glass is cooled to 25° C.

The refractive index can be measured by a known method, and the measurement is preferably carried out with an accuracy that the significant number of figures is 6 (five figures after the decimal point). The measurement of the refractive index can use "Method of Measurement of Refractive Index of Optical Glass" of Japan Optical Glass Industry Society Standard JOGIOS 01-1994.

When a glass has a certain form or volume such as the form of a small sphere or a thin lens, there are some cases where the glass cannot be processed so as to have a form and dimensions specified in the above Standard. In such cases, the glass is heated, softened, press-molded and annealed so that the glass has a prism form of which the two surfaces meet at a predetermined angle. And, the glass is measured for a refractive index on the basis of the same principle as that of the above Standard. The temperature for press-molding the glass into a prism form is a glass-softenable temperature at the highest, and this heating temperature is considerably lower than a temperature at which the glass is melted, so that the influence of the heating on the concentration of a volatile substance is negligible and that the amount of a change from the refractive index before the above heating to the refractive index after the above heating is negligible.

For decreasing or overcoming the striae of the glass, not only a decrease in the concentration of the volatile substance but also a decrease in the molding temperature is effective.

Preferred embodiments of the optical glass of the present invention will be explained below.

The optical glass of the present invention is formed of a fluorine-containing glass, and specific examples of the optical glass include a fluorophosphate glass, a fluoroborate glass and a fluorosilicate glass. The optical glass that is a fluorophosphate glass will be referred to as "optical glass I", and the optical glass that is a fluoroborate glass or a fluorosilicate glass, as "optical glass II", hereinafter.

The optical glass I that is a fluorophosphate glass has a first preferred embodiment (to be referred to as "optical glass I-A" hereinafter) which is an optical glass comprising, by cationic %, 5 to 50% of $P^{5+}$,
0.1 to 40% of $Al^{3+}$,
0 to 20% of $Mg^{2+}$,
0 to 25% of $Ca^{2+}$,
0 to 30% of $Sr^{2+}$,
0 to 30% of $Ba^{2+}$,
0 to 30% of $Li^+$,
0 to 10% of $Na^+$,
0 to 10% of $K^+$,
0 to 10% of $Y^{3+}$,
0 to 5% of $La^{3+}$ and
0 to 5% of $Gd^{3+}$.

In the optical glass I-A, the content ratio of $F^-$ and $O^{2-}$ as anionic components is preferably such that the molar ratio of $F^-$ to the total content of $F^-$ and $O^{2-}$, $F^-/(F^-+O^{2-})$, is from 0.25 to 0.95. When the content ratio of the anionic components is determined as described above, the glass can be imparted with a low-dispersion property.

The above optical glass I-A can realize optical properties represented by a refractive index $nd^{(1)}$ of 1.40000 to 1.60000 and an Abbe's number (νd) of 67 or more. While the upper limit of the Abbe's number (νd) is not specially limited, preferably, an upper limit of 100 or less is a target for stable production of the glass.

The above glass I-A preferably contains at least two components of $Ca^{2+}$, $Sr^{2+}$ and $Ba^{2+}$ as divalent cationic components ($R^{2+}$).

In the above optical glass I-A, preferably, the total content of $Mg^{2+}$, $Ca^{2+}$, $Sr^{2+}$ and $Ba^{2+}$ as divalent cationic components ($R^{2+}$) is 1 cationic % or more, and more preferably the content of each of $Mg^{2+}$, $Ca^{2+}$, $Sr^{2+}$ and $Ba^{2+}$ is 1 cationic % or more.

The composition of the above optical glass I-A will be explained below. Contents of cationic components by % hereinafter stand for contents thereof by cationic % based on molar ratio, and contents of anionic components by % hereinafter stand for contents thereof by anionic % based on molar ratio.

$P^{5+}$ is an essential cationic component as a network former of the glass. When the content of $P^{5+}$ is less than 5%, the glass is degraded in stability. When it is over 50%, the content ratio of oxygen in the glass is increased since it is required to introduce $P^{5+}$ in the form of an oxide raw material, so that no intended optical properties are attained. The content of $P^{5+}$ is therefore limited to 5 to 50%, and it is more preferably 5% to 40%, particularly preferably 5% to 35%. When $P^{5+}$ is introduced, it is not proper to use $PCl_5$ since it corrodes platinum and violently volatilizes to hinder stable production, and it is preferred to introduce $P^{5+}$ in the form of a phosphate.

$Al^{3+}$ is a component that improves the fluorophosphate glass in stability. When the content of $Al^{3+}$ is less than 0.1%, the glass is degraded in stability. When it exceeds 40%, the glass transition temperature (Tg) and the liquidus temperature (LT) greatly increase, so that the shaping temperature increases and that striae are hence intensely generated due to surface volatilization during shaping. It is therefore no longer possible to obtain a uniform glass shaped material, in particular, a press-molding preform. The content of $Al^{3+}$ is therefore limited to 0.1% to 40%, and it is more preferably 5% to 40%, particularly preferably 10% to 35%.

When introduced, $Mg^{2+}$, $Ca^{2+}$, $Sr^{2+}$ and $Ba^{2+}$ as divalent cationic components ($R^{2+}$) contribute to improvement in the stability of the glass. When they are introduced to excess, however, the glass stability is degraded, so that the contents of $Mg^{2+}$, $Ca^{2+}$, $Sr^{2+}$ and $Ba^{2+}$ are preferably limited to the following ranges.

First, the content of $Mg^{2+}$ is preferably 0 to 20%, more preferably 1 to 20%, still more preferably 5 to 15%, particularly preferably 5 to 10%.

The content of $Ca^{2+}$ is preferably 0 to 25%, more preferably 1 to 25%, still more preferably 5 to 20%, particularly preferably 5 to 16%.

The content of $Sr^{2+}$ is preferably 0 to 30%, more preferably 1 to 30%, still more preferably 5 to 25%, particularly preferably 10 to 20%.

The content of $Ba^{2+}$ is preferably 0 to 30%, more preferably 1 to 30%, still more preferably 1 to 25%, yet more preferably 5 to 25%, particularly preferably 8 to 25%.

It is preferred to introduce at least two components of $Mg^{2+}$, $Ca^{2+}$, $Sr^{2+}$ and $Ba^{2+}$ rather than to introduce a single one of them, and it is more preferred to introduce at least two components of $Ca^{2+}$, $Sr^{2+}$ and $Ba^{2+}$. For further improving the effect produced by the divalent cationic components ($R^{2+}$), it is preferred to adjust the total content of $Mg^{2+}$, $Ca^{2+}$, $Sr^{2+}$ and $Ba^{2+}$ to 1 cationic % or more. Further, when the content of any one of these exceeds its upper limit, the stability is sharply decreased. While $Ca^{2+}$ and $Sr^{2+}$ may be introduced in a relatively large amount, $Mg^{2+}$ and $Ba^{2+}$ in particular decrease the stability when introduced in a large amount. However, $Ba^{2+}$ is a component that realizes a high refractive index while maintaining low-dispersion, so that it is preferred to introduce $Ba^{2+}$ in a relatively large amount so long as the stability is not impaired.

$Li^+$ is a component that decreases the glass transition temperature (Tg) without impairing the stability. However, when the content thereof exceeds 30%, the durability of the glass is impaired and at the same time the processability is decreased. The content of $Li^+$ is therefore limited to 0 to 30%, and it is preferably in the range of 0 to 25%, more preferably 0 to 20%.

However, when it is intended in particular to further decrease the glass transition temperature for use of the glass in precision press-molding, it is preferred to adjust the content of $Li^+$ to 2 to 30%, it is more preferred to adjust the content thereof to 5 to 25%, and it is still more preferred to adjust the content thereof to 5 to 20%.

Like $Li^+$, $Na^+$ and $K^+$ has an effect that the glass transition temperature (Tg) is decreased. At the same time, however, they tend to increase the thermal expansion coefficient as compared with $Li^+$. NaF and KF has very high solubility in water as compared with LiF and hence degrade the glass in water resistance, so that the content of each of $Na^+$ and $K^+$ is limited to 0 to 10%. The content of each of $Na^+$ and $K^+$ is preferably in the range of 0 to 5%, and it is more preferred to introduce none of them.

$Y^{3+}$, $La^{3+}$ and $Gd^{3+}$ have effects that the glass is improved in stability and durability and that the refractive index is increased. When the content of $Y^{3+}$ is over 10% or the content of each of $La^{3+}$ and $Gd^{3+}$ is over 5%, conversely, the stability is degraded, and the glass transition temperature is greatly increased, so that the content of $Y^{3+}$ is limited to 0 to 10% and the content of each of $La^{3+}$ and $Gd^{3+}$ is limited to 0 to 5%. The content of $Y^{3+}$ is preferably in the range of 0 to 5%. The content of each of $La^{3+}$ and $Gd^{3+}$ is preferably in the range of 0 to 3%.

For stable production of a high-quality glass, it is preferred to adjust the total content of $P^{5+}$, $Al^{3+}$, $Mg^{2+}$, $Ca^{2+}$, $Sr^{2+}$, $Ba^{2+}$, $Li^+$, $Y^{3+}$, $La^{3+}$ and $Gd^{3+}$ to over 95% based on cationic %. The above total content is more preferably over 98%, still more preferably over 99%, and yet more preferably 100%.

In addition to the above cationic components, the above optical glass I-A may contain cationic components of Ti, Zr, Zn, lanthanoids and B, etc., so long as the object of the present invention is not impaired.

For obtaining an optical glass that realizes the intended optical properties and at the same time has excellent stability, the amount ratio of the anionic components is determined such that the molar ratio of content of $F^-$ to the total content of $F^-$ and $O^{2-}$, $F^-/(F^- + O^{2-})$, is from 0.25 to 0.95.

The optical glass I-A is excellent not only as a glass for producing an optical element by grinding and polishing but as a glass for producing an optical element by precision press-molding.

The above optical glass I-A includes one embodiment that is an optical glass containing 2 to 30 cationic % of $Li^+$ (to be referred to as "optical glass I-A-a" hereinafter). In this optical glass I-A-a, the viscosity at the liquidus temperature can be decreased, and the shaping (molding) temperature can be decreased. By introducing 2 cationic % or more of $Li^+$, the shaping temperature of the glass and the glass transition temperature can be further decreased, and the volatilization from the surface of a preform can be further reduced. When the content of $Li^+$ exceeds 30 cationic %, the glass is degraded in durability and processability. In addition, since the temperature for precision press-molding can be also decreased by introducing $Li^+$, the time period required for heating a preform and the time period required for cooling a press-molded product can be decreased, so that the tact time as a whole can be decreased and that an improvement in throughput is hence attained. Further, since the press-molding temperature is decreased, the reaction between the glass and press mold can be suppressed, so that the surface state of a press-molded product is rendered excellent and that the lifetime of the press mold can be increased.

The optical glass I of the present invention, which is a fluorophosphate glass, exhibits high transmittance in a visible light region except for a case where it contains a colorant. When a 10 mm thick sample having two flat surfaces in parallel with each other is prepared from the optical glass I and when light is caused to enter perpendicular to the above two surfaces, the optical glass I exhibits a transmittance except for reflection loss at the sample surface, measured at a wavelength of 400 nm to 2,000 nm, of 80% or more, preferably 95% or more.

The above optical glass I-A-a, having the above specified content of $Li^+$, has a glass transition temperature (Tg) of 470° C. or lower, preferably 430° C. or lower.

In the above optical glass I-A-a, further, $Li^+$ out of alkali metal ions is actively incorporated, so that the optical glass I-A-a has a relatively small thermal expansion coefficient and also has relatively superior water resistance. Therefore, the glass can be processed into a press-molding preform by polishing the glass or processed into an optical element having a smooth glass surface and a high quality by polishing.

The above optical glass I-A (including the optical glass I-A-a) exhibits excellent water resistance and chemical durability, so that even if a precision press-molding preform is produced and then stored for a long period of time before it is press-molded, the preform surface is not altered. Further, since the surface of an optical element is not easily altered, the optical element can be used in a surface-cloudiness-free state for a long period of time.

In the optical glass I-A-a, further, the glass melting temperature can be adjusted to a temperature lower by approximately 50° C. than the melting temperature of a glass having optical constants equivalent to the above optical glass I-A-a and containing no Li, so that there can be reduced or overcome failures such as the coloring of the glass caused by dissolving of platinum from a melting vessel, the inclusion of bubbles and the occurrence of striae.

Generally, a fluorophosphate glass has a high viscosity when it is caused to flow out, so that it involves a defect that when a preform is produced by separating a molten glass gob having a predetermined weight from a molten glass that is flowing out, and shaping it, the fluorophosphate glass forms a narrow thread and such a thread-like portion remains on the surface of the glass gob and forms a projection. When it is attempted to overcome the above defect by decreasing the viscosity of the glass that is flowing out, it is required to increase the temperature for causing the glass to flow out, and the volatilization of fluorine from the glass surface is aggravated as described already, so that there is caused a problem that the occurrence of striae is intensified.

For decreasing the temperature suitable for shaping a molten glass in order to overcome the above problem, the glass composition of the above optical glass I-A-a is determined such that the temperature at which the glass exhibits a predetermined viscosity is lower than a temperature at which a conventional fluorophosphate glass exhibits such a viscosity. While the glass transition temperature is far lower than the temperature for shaping a molten glass into a preform, the shaping temperature of a glass having a low glass transition temperature can be also decreased, so that the glass composition is adjusted such that the glass transition temperature comes to be in the above range for reducing or overcoming the problem of thread formation and striae during shaping.

By decreasing the glass transition temperature, further, the temperature for heating a glass for press-molding, in particular a precision press-molding preform can be decreased as described already, and there can be hence produced effects that a reaction between the glass and press mold is moderated and that the lifetime of the press mold can be increased.

Therefore, the above optical glass I-A-a is suitable as a glass material for press-molding, in particular as a glass material for precision press-molding, and it is also suitable as a glass material for producing an optical element by grinding and polishing. Preferred embodiments of the optical glass I-A-a are the same as those of the optical glass I-A except that the content of $Li^+$ is limited to the range specified above.

The optical glass I that is a fluorophosphate glass has a second preferred embodiment (to be referred to as "optical glass I-B" hereinafter) which is a fluorophosphate glass containing $Cu^{2+}$ and this glass works as a near-infrared-absorbing glass. The optical glass I-B is suitable as a color-collecting filter for semiconductor image-sensing device such as CCD or CMOS. When the optical glass I-B is used for the above purpose, it is desirable to adjust the content of $Cu^{2+}$ to 0.5 to 13 cationic %.

The optical glass I-B particularly preferably has a composition comprising, by cationic %, 11 to 45% of $P^{5+}$,
0 to 29% of $Al^{3+}$,
0 to 43% of total of $Li^+$, $Na^+$ and $K^+$,
14 to 50% of total of $Mg^{2+}$, $Ca^{2+}$, $Sr^{2+}$, $Ba^{2+}$ and $Zn^{2+}$ and
0.5 to 13% of $Cu^{2+}$
and comprising, by anionic %,
17 to 80% of $F^-$.

In the above composition, preferably, the other anionic component is entirely $O^{2-}$, and no "other" anionic component excluding $O^{2-}$ is present.

In the above composition, $P^{5+}$ is a basic component of the fluorophosphate glass and is an essential component for bringing the absorption in an infrared region by $Cu^{2+}$. When the content of $P^{5+}$ is less than 11%, the color of the glass is degraded and comes to be greenish. When it exceeds 45%, the glass is degraded in weathering resistance and devitrification resistance. The content of $P^{5+}$ is therefore preferably limited to 11 to 45%, and it is more preferably 20 to 45%, still more preferably 23 to 40%.

$Al^{3+}$ is a component that improves the fluorophosphate glass in devitrification resistance, heat resistance, thermal shock resistance, mechanical strength and chemical durability. However, when the content of $Al^{3+}$ exceeds 29%, the glass is degraded in near infrared red absorption property. The content of $Al^{3+}$ is therefore preferably limited to 0 to 29%, and it is more preferably 1 to 29%, still more preferably 1 to 25%, yet more preferably 2 to 23%.

$Li^+$, $Na^+$ and $K^+$ are components that improve the glass in meltability and devitrification resistance and improve the glass in transmittance in a visible light region. However, when the total content of these components exceeds 43%, the glass is degraded in durability and processability. The total content of $Li^+$, $Na^+$ and $K^+$ is therefore preferably limited to 0 to 43%, and it is preferably 0 to 40%, more preferably 0 to 36%.

Of the alkali components, $Li^+$ is excellent in the above function, and it is more preferred to adjust the content of $Li^+$ to 15 to 30%, and it is still more preferred to adjust the same to 20 to 30%.

$Mg^{2+}$, $Ca^{2+}$, $Sr^{2+}$, $Ba^{2+}$ and $Zn^{2+}$ are useful components that improve the glass in devitrification resistance, durability and processability. When they are introduced to excess, however, the glass is degraded in devitrification resistance. It is therefore preferred to adjust the total content of $Mg^{2+}$, $Ca^{2+}$, $Sr^{2+}$, $Ba^{2+}$ and $Zn^{2+}$ to 14 to 50%, and it is more preferred to adjust the same to 20 to 40%.

The content of $Mg^{2+}$ is preferably in the range of 0.1 to 10%, more preferably in the range of 1 to 8%.

The content of $Ca^{2+}$ is preferably in the range of 0.1 to 20%, more preferably in the range of 3 to 15%.

The content of $Sr^{2+}$ is preferably in the range of 0.1 to 20%, more preferably in the range of 1 to 15%.

The content of $Ba^{2+}$ is preferably in the range of 0.1 to 20%, more preferably in the range of 1 to 15%, still more preferably in the range of 1 to 10%.

$Cu^{2+}$ is works for the property of absorbing near infrared. When the content of $Cu^{2+}$ is less than 0.5%, the near infrared absorption is small. When it exceeds 13%, the glass is degraded in devitrification resistance. The content of $Cu^{2+}$ is therefore preferably 0.5 to 13%, more preferably 0.5 to 10%, still more preferably 0.5 to 5%, yet more preferably 1 to 5%.

$F^-$ is an essential anionic component in the optical glass I-B, and it decreases the melting point of the glass and improves the glass in weathering resistance. Since the optical glass I-B contains $F^-$, the melting temperature of the glass is decreased, the reduction of $Cu^{2+}$ is suppressed and desired optical properties can be obtained. When the content of $F^-$ is less than 17%, the glass is degraded in weathering resistance. When it exceeds 80%, the content of $O^{2-}$ decreases, so that a coloring around 400 nm takes place due to monovalent $Cu^+$. The content of $F^-$ is therefore preferably adjusted to 17 to 80%. For further improving the glass in the above properties, it is more preferred to adjust the content of $F^-$ to 25 to 55%, and it is still more preferred to adjust the same to 30 to 50%.

$O^{2-}$ is an important anionic component in the optical glass I-B, and $O^{2-}$ preferably constitutes the entire anionic component excluding $F^-$. The content of $O^{2-}$ is therefore a content in the range obtained by deducting the content of $F^-$ in one of the above preferred ranges from 100%. When the content of $O^{2-}$ is too small, divalent $Cu^{2+}$ is reduced to $Cu^+$, so that the absorption in a short wavelength region, in particular around 400 nm, is intensified, and the color of the glass comes to be green. When the above content is too large, the viscosity of the glass increases and the melting temperature increases, so that the glass is degraded in transmittance.

Since Pb and As have strong harmful effects, it is desirable to use none of them.

The optical glass I-B preferably has the following transmittance properties.

When the optical glass I-B has a certain thickness at which it exhibits a transmittance of 50% at a wavelength of 615 nm in spectral transmittance at a wavelength of 500 to 700 nm, the optical glass I-B has the following spectral transmittance properties at a wavelength of 400 to 1,200 nm.

The transmittance at a wavelength of 400 nm is 78% or more, preferably 80% or more, more preferably 83% or more, still more preferably 85% or more.

The transmittance at a wavelength of 500 nm is 85% or more, preferably 88% or more, more preferably 89% or more.

The transmittance at a wavelength of 600 nm is 51% or more, preferably 55% or more, more preferably 56% or more.

The transmittance at a wavelength of 700 nm is 12% or less, preferably 11% or less, more preferably 10% or less.

The transmittance at a wavelength of 800 nm is 5% or less, preferably 3% or less, more preferably 2.5% or less, still more preferably 2.2% or less, yet more preferably 2% or less.

The transmittance at a wavelength of 900 nm is 5% or less, preferably 3% or less, more preferably 2.5% or less, still more preferably 2.2% or less, yet more preferably 2% or less.

The transmittance at a wavelength of 1,000 nm is 7% or less, preferably 6% or less, more preferably 5.5% or less, still more preferably 5% or less, yet more preferably 4.8% or less.

The transmittance at a wavelength of 1,100 nm is 12% or less, preferably 11% or less, more preferably 10.5% or less, still more preferably 10% or less.

The transmittance at a wavelength of 1,200 nm is 23% or less, preferably 22% or less, more preferably 21% or less, still more preferably 20% or less.

That is, the absorption of near infrared ray at a wavelength of 700 to 1,200 is large, and the absorption of visible light at a wavelength of 400 to 600 nm is small. The transmittance as used herein refers to a value obtained by providing a glass sample having two optically polished flat surfaces that are in parallel with each other, causing light to enter the glass sample through one of the flat surfaces at right angles with the flat surface and dividing the intensity of light that comes out through the other of the above two flat surfaces with the intensity that the light has before caused to enter the sample. This transmittance is also called "external transmittance".

Based on the above properties, excellent color correction is accomplished for a semiconductor image-sensing device such as CCD, CMOS or the like.

The optical glass of the present invention includes an optical glass (optical glass II) that is a fluoroborate glass or a fluorosilicate glass.

The optical glass II also contains fluorine and boron or silicon as components in its glass raw materials, so that an easily volatile substance is generated by heating and melting the glass raw materials. Therefore, as is done in the case of the optical glass I that is the fluorophosphate glass, the easily volatile substance (volatile substance) is substantially removed before the production of a preform from a molten glass by shaping, whereby there can be reduced or prevented the occurrence of striae and the fluctuation of the refractive index which are caused by the volatilization of the volatile substance during the shaping. In the optical glass II, it can be also considered that the target of a glass from which the easily volatile substance is substantially removed is a glass that has a refractive index $nd^{(1)}$ and a refractive index $nd^{(2)}$ which are substantially equivalent to each other, more specifically, the absolute value of $nd^{(2)}-nd^{(1)}$ being 0.00300 or less, wherein the refractive index $nd^{(2)}$ is a refractive index of the glass after the glass is re-melted in a nitrogen atmosphere at 900° C. for 1 hour, cooled to its glass transition temperature and then cooled to 25° C. at a temperature decrease rate of 30° C./hour and the refractive index $nd^{(1)}$ is a refractive index of the glass that is not treated as described hereinabove. The method of measurement of refractive indexes, the conditions for re-melting and preferred ranges of the above absolute value are the same as those explained with regard to the optical glass I.

In the optical glasses I and II, the volatile substance in each glass is removed or decreased, so that it is arranged that a substance part of which is taken away by the volatilization is introduced in a larger amount when glass raw material are prepared for a glass composition. The above glass composition is adjusted such that $nd^{(1)}$ comes to be a desired value while the absolute value of $nd^{(2)}-nd^{(1)}$ is adjusted to a predetermined value or less. A typical component whose content is decreased by the volatilization is fluorine. With regard to other components, the glass composition can be adjusted on the basis of the above guiding principle depending upon an end glass composition.

The optical glass of the present invention is produced by melting glass raw materials under heat in a vessel, then, decreasing the concentration of a volatile substance in the vessel, then causing the glass to flow out and shaping. Conditions for melting can be determined as required such that the absolute value of $nd^{(2)}-nd^{(1)}$ is 0.00300 or less.

During the shaping, a high-temperature glass is liable to react with water in atmosphere, and the reaction degrades the glass in quality, so that it is preferred to cause the glass flow out and shape it in dry atmosphere. The water content in the dry atmosphere is desirably a content equivalent to a dew-point temperature of −30° C. or lower. For the atmosphere, an inert gas such as nitrogen, argon or the like can be used.

The thus-obtained glass shaped material is subjected to machine processes such as cutting, grinding, polishing, etc., to form a press-molding glass material or a precision press-molding preform to be described in detail below, or to form an optical element such as a lens, a prism, a filter or the like.

[Precision Press-molding Preform and Process for the Production Thereof]

The precision press-molding preform of the present invention is characteristically formed of the above optical glass of the present invention. The precision press-molding preform as used herein refers to a material obtained by pre-shaping a glass having a weight equivalent to the weight of a press-molded product into a form suitable for precision press-molding.

A fluorophosphate glass has the properties of having a large abrasion degree and a large thermal expansion coefficient as compared with other general optical glass. These properties are not desirable for polishing. When the abrasion degree is large, the accuracy of finishing is degraded and a polishing mark is liable to remain on the glass surface. The polishing is carried out while a grinding liquid is applied on the glass. When the grinding liquid is applied on the glass of which the temperature is increased by polishing or when a glass having a polishing mark on a surface is poured into a wash liquid having an increased temperature during its ultrasonic cleaning, the glass is exposed to a large change in temperature. Having a large thermal expansion coefficient, a fluorophosphate glass is liable to have a problem that it is broken due to a thermal shock. It is therefore desirable to produce any one of a precision press-molding preform and an optical element by a method that is not based on polishing. From this viewpoint, the entire surface of a precision press-molding preform is desirably a surface formed by solidification of a glass in a molten state, and an optical element is desirably produced by precision press-molding.

When the entire surface of a preform is formed by solidification of a glass in a molten state, the breaking of the preform can be prevented or decreased when the preform is washed or heated before precision press-molding.

The process for the production of a press-molding preform, provided by the present invention, will be explained below.

The process for the production of a press-molding preform, provided by the present invention, includes a first embodiment (to be referred to as "preform production process I" hereinafter) which comprises causing a molten glass to flow out of a pipe, separating a molten glass gob and shaping it into a preform during the cooling of the glass.

In the preform production process I and a preform production process II to be described later, a molten glass can be prepared in the same manner as in the above production process of the optical glass of the present invention. A molten glass whose volatile substance concentration is reduced is caused to continuously flow, at a constant rate, out of a pipe made of a platinum alloy or platinum which pipe is heated to a predetermined temperature. A molten glass gob having a weight of one preform or a total weight of one preform and a portion to be removed as will be described later is separated from the molten glass that has flowed out. When the molten glass gob is separated, it is desirable not to use a cutting blade so that no cutting mark remains. For example, there is preferably employed a method in which a molten glass is caused to drop from the flow outlet of the pipe or a method in which the leading end of a molten glass flow that is flowing out is supported with a support member and the support member is rapidly moved downward at a time when a molten glass gob having a predetermined weight is separable, to separate the molten glass gob from the leading end of the molten glass flow by utilizing the surface tension of the molten glass.

The separated molten glass gob is shaped into a desired form on/above the concave portion of a preform-shaping mold during the cooling of the glass. In this case, for preventing the formation of a crease on the preform surface or the breaking called cracking of the glass during the cooling of the glass, it is preferred to carry out the shaping in a state where the glass gob is floated by applying a gas pressure upwardly to the glass gob. The cooling of the above glass gob surface by blowing the gas to the surface in this case is preferred for decreasing or preventing the occurrence of striae.

After the temperature of the glass decreases to a temperature range in which an external force does not deform the preform, the preform is taken out of the preform shaping mold and gradually cooled.

For further decreasing the volatilization from the glass surface, preferably, the glass is caused to flow out, and the preform is shaped, in a dry atmosphere (dry nitrogen atmosphere, a dry air atmosphere, a dry mixture gas atmosphere of nitrogen and oxygen, or the like) as described already.

The second embodiment (to be referred to as "preform production process II" hereinafter) of the process for the production of a press-molding preform, provided by the present invention, is a process for the production of a preform which comprises shaping a molten glass into a glass shaped material and machining the glass shaped material to produce a preform formed of the optical glass of the present invention.

The above molten glass is prepared as described already. In the preform production process II, first, the molten glass is caused to continuously flow out of a pipe into a mold positioned below the pipe. The mold has a flat bottom portion, three side walls standing and surrounding the bottom portion and one open side. The mold is arranged and fixed such that the two side walls that are adjacent to the open side and stand on side edges of the bottom are opposed to each other in parallel, that the center of the bottom surface is positioned vertically below the pipe and that the bottom surface is horizontal, the molten glass cast into the mold is spread in a region surrounded with the side walls so as to have a uniform thickness, and after the molten glass is cooled, the glass is withdrawn from the open side in the horizontal direction at a constant rate. The glass withdrawn is transferred to an annealing furnace and annealed. In this manner, there is obtained a plate-like glass-shaped material formed of the optical glass of the present invention having a constant width and a constant thickness. In this manner, there can be obtained a glass shaped material of which the surface striae are reduced or suppressed.

Then, the plate-like glass shaped material is cut or split to obtain a plurality of glass pieces called cut pieces, and these glass pieces are ground and polished to finish press-molding preforms having an intended weight each.

In another method, a cylindrical mold having a through hole is arranged and fixed vertically below the pipe such that the central axis of the through hole is in the vertical direction. In this case, preferably, the mold is arranged such that the central axis of the through hole is positioned vertically below the pipe. And, the molten glass is caused to flow from the pipe into the through hole of the mold to fill the through hole with the glass, and the glass solidified is withdrawn from the opening portion of lower end of the through hole in the vertically downward direction at a constant rate and gradually cooled to obtain a columnar-rod-like glass shaped material. The thus-obtained glass shaped material is annealed and the annealed glass is cut or split perpendicular to the central axis of the columnar-rod-shaped material to obtain a plurality of glass pieces. Then, the glass pieces are ground and polished to finish press-molding preforms having an intended weight each. In this method also, preferably, the molten glass is caused to flow out, and the shaping is carried out, in a dry atmosphere as described already. Further, in this method also, it is effective for reducing or preventing the occurrence of striae to promote the cooling of the glass by blowing gas onto the glass surface.

Both the preform production processes I and II are suitable as a process for the production of a precision press-molding preform since high-quality preforms having high weight accuracy can be produced.

In the preform production process II, a glass shaped material is machined, so that not 100% of the glass shaped material is used for a preform. Since, however, the surface striae of the glass shaped material can be reduced or suppressed, the effective use volume of the glass shaped material can be increased. The material cost for the fluorophosphate glass among optical glasses is expensive, so that the production cost of preforms and optical elements can be decreased by effective use of the glass.

The above preform can be produced from any one of the optical glasses I and II of the present invention depending upon an end use.

[Optical Element and Process for the Production Thereof]

The optical element of the present invention is characteristically formed of the optical glass of the present invention. The optical element of the present invention is formed of the optical glass of the present invention, so that there can be provided an optical element that takes advantage of the property of low dispersion. Further, the optical element of the present invention is formed of the glass excellent in water resistance and chemical durability, so that according to the present invention there can be provided an optical element that is free from a failure such as fogging on the surface when it is used for a long period of time.

The optical element is not specially limited with regard to its kind, form, etc., while it is suitable for an aspherical lens, a spherical lens, a microlens, a lens array, a prism, a diffraction grating, a prism with a lens, a lens with a diffraction grating and the like.

When viewed from use, the optical element is suitable for an optical element constituting an image-sensing device, such as a lens for a digital camera or a lens for a camera of a cellphone with the camera, an optical pickup lens, a collimator lens or the like.

An optical thin film such as an anti-reflection film may be formed on the optical element surface as required.

The process for the production of an optical element, provided by the present invention, will be explained below.

The process for the production of an optical element, provided by the present invention, comprises heating the precision press-molding preform of the present invention or a precision press-molding preform produced by the preform production process of the present invention and precision press-molding the preform in a press mold.

The above precision press-molding is also called "mold optics" and well known in the field of this art. In an optical element, the surface that transmits, refracts, diffracts or reflects light is called an optical function surface (when a lens is taken as an example, lens surfaces such as the aspherical surface of an aspherical lens, the spherical surface of a spherical lens, etc., correspond to the optical function surface). According to the precision press-molding, the optical function surface can be formed by accurately transferring the form of molding surface of a press mold to a glass, and it is not required to apply machine processes such as grinding, polishing, etc., for finishing the optical function surface.

The process for the production of an optical element, provided by the present invention, is therefore suitable for producing optical elements such as a lens, a lens array, a diffraction grating, a prism, etc., and it is in particular suitable for producing aspherical lenses highly productively.

According to the process for the production of an optical element, provided by the present invention, optical elements having the above optical properties can be produced, and since the glass has a low glass transition temperature (Tg), the press-molding temperature can be decreased, so that damage on the molding surface of a press mold can be decreased and that the lifetime of the mold can be hence increased. Further, since the glass constituting the preform has high stability, the devitrification in the steps of re-heating and pressing can be effectively prevented. Further, a series of steps starting with the melting of the glass and ending with the obtaining of a final product can be highly productively carried out.

As a press mold for use in the precision press-molding, there can be used a known press mold such as a press mold obtained by forming a mold release film on the molding surface of a mold material formed of a refractory ceramics such as silicon carbide, zirconia, alumina or the like. Above all, a press mold formed of silicon carbide is preferred, and a carbon-containing film or the like can be used as a mold release film. From the viewpoint of durability and a cost, a carbon film is preferred.

In the precision press-molding, it is preferred to employ an atmosphere of a non-oxidizing gas for the molding so that the molding surface of the press mold is maintained under an excellent condition. The non-oxidizing gas is preferably selected from nitrogen or a mixture of nitrogen with hydrogen.

The precision press-molding for use in the process for the production of an optical element, provided by the present invention, includes the following two embodiments of precision press-molding 1 and precision press-molding 2.

(Precision Press-molding 1)

The precision press-molding 1 is a method in which a preform is introduced into a press mold and the preform and the press mold are heated together to carry out precision press-molding.

In the precision press-molding 1, preferably, the above press mold and the above preform are heated together to a temperature at which the glass constituting the preform exhibits a viscosity of $10^6$ to $10^{12}$ dPa·s to carry out precision press-molding.

Further, a press-molded product is desirably taken out of the press mold after cooled to a temperature at which the above glass preferably exhibits a viscosity of $10^{12}$ dPa·s or more, more preferably $10^{14}$ dPa·s or more, still more preferably $10^{16}$ dPa·s or more.

Under the above conditions, not only the form of molding surface of the press mold can be accurately transferred to the glass, but also the precision press-molded product can be taken out without any deformation.

(Precision Press-molding 2)

The precision press-molding 2 is a method in which a pre-heated preform is introduced into a press mold separately pre-heated, to carry out precision press-molding.

In the precision press-molding 2, the preform is pre-heated before introduced into the molded, so that an optical element having excellent surface accuracy free of surface defects can be produced while the cycle time can be decreased.

The pre-heating temperature for the press mold is preferably set at a temperature lower than the pre-heating temperature for the preform. By so setting the pre-heating temperature for the press mold, the abrasion of the press mold can be decreased.

In the precision press-molding 2, the above preform is preferably preheated to a temperature at which the glass constituting the preform exhibits a viscosity of $10^9$ dPa·s or less, more preferably $10^9$ dPa·s.

Further, it is preferred to pre-heat the above preform while it is floated, and while the preform is floated, it is more preferably pre-heated to a temperature at which the glass constituting the preform exhibits a viscosity of $10^{5.5}$ to $10^9$ dPa·s, still more preferably, $10^{5.5}$ to less than $10^9$ dPa·s.

Further, it is preferred to initiate the cooling of the glass simultaneously with, or some time after, the start of pressing.

While the temperature of the press mold is adjusted to a temperature lower than the above pre-heating temperature for the preform, a temperature at which the above glass exhibits a viscosity of $10^9$ to $10^{12}$ dPa·s can be used as an index.

In the above method, it is preferred to cool a precision press-molded product to a temperature at which the above glass exhibits a viscosity of $10^{12}$ dPa·s or less before the product is taken out.

An optical element obtained by the precision press-molding is taken out of the press mold and gradually cooled as required. When the precision press-molded product is an optical element, an optical thin film may be coated on the surface as required.

While the process for the production of an optical element, provided by the present invention, is as described above, the optical element of the present invention can be also produced by other method. For example, it can be produced by causing a molten glass to flow out to form a glass shaped material, annealing the glass shaped material and then machining it. Further, optical elements such as various lenses can be also produced by slicing the already described columnar rod-like glass shaped material at right angles with the columnar axis and grinding and polishing the thus-obtained columnar glass pieces.

For the above optical elements, one of the optical glasses I and II can be used depending upon purposes.

EXAMPLES

The present invention will be explained further in detail with reference to Examples hereinafter, while the present invention shall not be limited by these Examples.

Example 1

Preparation Example of Optical Glass

As glass raw materials, phosphate, fluoride, etc., corresponding to glass components were prepared and the glass raw materials were weighed so as to obtain a glass having a composition shown in Table 1 or 2 and fully mixed.

The above-obtained raw materials were melted in a platinum crucible at 850° C. for 1 hour, and the melt was rapidly cooled and pulverized to obtain rough melt cullet. The rough melt cullet in an amount of 10 kg was charged into a platinum crucible and after the crucible was tightly sealed with a cover, the cullet was melted by heating it to 900° C. Then, a fully dried gas was introduced into the platinum crucible, and while the dry atmosphere was maintained, the molten glass was refined at 1,100° C. for 2 hours. The dry gas can be selected, for example, from inert gases such as nitrogen, a gas mixture of an inert gas with oxygen or oxygen.

After the refining, the glass temperature was decreased to 850° C. which was lower than the refining temperature, and then the glass was caused to flow out through a pipe connected to a bottom of the crucible. The gas introduced into the crucible was cleaned through a filter and discharged to an outside. In each of the above steps, the glass in the crucible was stirred for a uniform glass.

The thus-obtained molten glass was cast into a mold made of carbon in a dry nitrogen atmosphere. The cast glass was allowed to cool to a glass transition temperature and immediately thereafter the glass was placed in an annealing furnace, annealed at a temperature around the glass transition temperature for 1 hour and gradually cooled in the annealing furnace to room temperature. In this manner, optical glasses Nos. 1 to 11 shown in Tables 1 and 2 were obtained.

The obtained optical glasses Nos. 1 to 11 were observed by magnification through a microscope to show none of a precipitated crystal and a non-melted raw material.

The thus-obtained optical glasses Nos. 1 to 11 were measured for refractive indexes (nd), Abbe's numbers (vd) and glass transition temperatures (Tg) as follows. Tables 1 and 2 show the measurement results.

(1) Refractive Index (nd) and Abbe's Number (vd)

Optical glasses obtained at a gradually cooling rate of −30° C./hour were used for the measurements of refractive indexes (nd) and Abbe's numbers (vd).

With regard to refractive indexes (nd), values obtained by measuring the optical glasses Nos. 1 to 11 under the above conditions were used as $nd^{(1)}$. The optical glasses Nos. 1 to 11 were re-melted, cooled and then measured for refractive indexes $nd^{(2)}$ as follows.

30 Grams of an optical glass was introduced into a crucible made of glassy carbon in a quartz glass chamber having a volume of 2 liters and having dry nitrogen gas introduced therein at a rate of 2 liters/minute, and the chamber was heated to 900° C., followed by re-melting of the glass at this temperature for 1 hour. Then, the glass was cooled to a temperature around a glass transition temperature in the chamber and then cooled to room temperature at a temperature decrease rate of −30° C./hour. The optical glasses Nos. 1 to 11 obtained in this manner were measured for refractive indexes $nd^{(2)}$.

Tables 1 and 2 show values of $nd^{(2)}-nd^{(1)}$ and absolute values of $nd^{(2)}-nd^{(1)}$ with regard to the optical glasses Nos. 1 to 11.

(2) Glass Transition Temperature (Tg)

Each glass was measured for a glass transition temperature (Tg) with an apparatus for thermomechanical analysis supplied by Rigaku Corporation at a temperature elevation rate of 4° C./minute.

TABLE 1

| No. | 1 | 2 | 3 | 4 | 5 | 6 |
|---|---|---|---|---|---|---|
| (Cationic %) | | | | | | |
| $P^{5+}$ | 26.0 | 27.0 | 29.0 | 25.9 | 24.9 | 14.0 |
| $Al^{3+}$ | 20.0 | 21.0 | 11.0 | 21.0 | 20.0 | 29.4 |
| $Mg^{2+}$ | 10.0 | 7.3 | 8.0 | 7.5 | 6.5 | 3.9 |
| $Ca^{2+}$ | 14.0 | 9.1 | 10.0 | 9.4 | 8.1 | 22.4 |
| $Sr^{2+}$ | 15.0 | 15.6 | 17.0 | 15.9 | 13.8 | 14.5 |
| $Ba^{2+}$ | 10.0 | 11.0 | 12.0 | 11.3 | 9.7 | 8.2 |
| $Li^+$ | 4.0 | 8.0 | 12.0 | 8.0 | 16.0 | 5.0 |
| $Y^{3+}$ | 1.0 | 1.0 | 1.0 | 1.0 | 1.0 | 2.6 |
| $La^{3+}$ | 0.0 | 0.0 | 0.0 | 0.0 | 0.0 | 0.0 |
| $Gd^{3+}$ | 0.0 | 0.0 | 0.0 | 0.0 | 0.0 | 0.0 |
| Total | 100.0 | 100.0 | 100.0 | 100.0 | 100.0 | 100.0 |
| (Anionic %) | | | | | | |
| $F^-$ | 64.1 | 62.1 | 56.5 | 63.5 | 63.4 | 81.5 |
| $O^{2-}$ | 35.9 | 37.9 | 43.5 | 36.5 | 36.6 | 18.5 |

TABLE 1-continued

| No. | 1 | 2 | 3 | 4 | 5 | 6 |
|---|---|---|---|---|---|---|
| $F^-/(F^- + O^{2-})$ | 0.641 | 0.621 | 0.565 | 0.635 | 0.634 | 0.815 |
| $nd^{(1)}$ | 1.50098 | 1.50674 | 1.52147 | 1.50204 | 1.49885 | 1.4679 |
| $nd^{(2)}$ | 1.50178 | 1.50744 | 1.52211 | 1.50277 | 1.49966 | 1.46888 |
| $nd^{(2)} - nd^{(1)}$ | 0.0008 | 0.0007 | 0.00064 | 0.00073 | 0.00081 | 0.00098 |
| $\mid nd^{(2)} - nd^{(1)} \mid$ | 0.0008 | 0.0007 | 0.00064 | 0.00073 | 0.00081 | 0.00098 |
| Abbe's number (vd) | 81.2 | 80.2 | 76.7 | 81.0 | 81.0 | 89.1 |
| Glass transition temperature (° C.) | 429 | 417 | 375 | 406 | 375 | 404 |

TABLE 2

| No. | 7 | 8 | 9 | 10 | 11 |
|---|---|---|---|---|---|
| (Cationic %) | | | | | |
| $P^{5+}$ | 38.0 | 38.0 | 29.0 | 29.0 | 29.0 |
| $Al^{3+}$ | 9.0 | 9.0 | 9.0 | 9.0 | 9.0 |
| $Mg^{2+}$ | 6.0 | 6.0 | 6.0 | 6.0 | 6.0 |
| $Ca^{2+}$ | 4.0 | 4.0 | 4.0 | 4.0 | 4.0 |
| $Sr^{2+}$ | 5.0 | 5.0 | 5.0 | 5.0 | 5.0 |
| $Ba^{2+}$ | 16.0 | 16.0 | 23.0 | 23.0 | 23.0 |
| $Li^+$ | 21.0 | 21.0 | 21.0 | 21.0 | 21.0 |
| $Y^{3+}$ | 1.0 | 1.0 | 3.0 | 1.0 | 1.0 |
| $La^{3+}$ | 0.0 | 0.0 | 0.0 | 2.0 | 0.0 |
| $Gd^{3+}$ | 0.0 | 0.0 | 0.0 | 0.0 | 2.0 |
| total | 100.0 | 100.0 | 100.0 | 100.0 | 100.0 |
| (Anionic %) | | | | | |
| $F^-$ | 33.5 | 27.4 | 42.9 | 42.9 | 42.9 |
| $O^{2-}$ | 66.5 | 72.6 | 57.1 | 57.1 | 57.1 |
| $F^-/(F^- + O^{2-})$ | 0.335 | 0.274 | 0.429 | 0.429 | 0.429 |
| $nd^{(1)}$ | 1.5549 | 1.5549 | 1.55067 | 1.55276 | 1.55221 |
| $nd^{(2)}$ | 1.55541 | 1.55541 | 1.55132 | 1.5535 | 1.55292 |
| $nd^{(2)} - nd^{(1)}$ | 0.00051 | 0.00051 | 0.00065 | 0.00074 | 0.00071 |
| $\mid nd^{(2)} - nd^{(1)} \mid$ | 0.00051 | 0.00051 | 0.00065 | 0.00074 | 0.00071 |
| Abbe's number (vd) | 71.0 | 71.0 | 72.1 | 71.8 | 71.8 |
| Glass transition temperature (° C.) | 374 | 374 | 367 | 366 | 368 |

As shown in Tables 1 and 2, all the optical glasses Nos. 1 to 11 of the present invention had desired refractive indexes, Abbe's numbers and glass transition temperatures and exhibited excellent low-temperature softening properties and meltability, and they were suitable as optical glasses for press molding.

Further, all of the values of $nd^{(2)}-nd^{(1)}$ and absolute values of $nd^{(2)}-nd^{(1)}$ were smaller than 0.00300.

Example 2

Preparation Example of Optical Glass

As glass raw materials, phosphate, fluoride, oxide, etc., corresponding to glass components were prepared and the glass raw materials were weighed so as to obtain a glass having a composition No. 12 or 13 shown in Table 3 and fully mixed. The thus-prepared glass raw materials were charged into a platinum crucible and the crucible was tightly sealed. While the glass raw materials were stirred at 790 to 850° C. in an electric furnace, the raw materials were heated and melted, and the melt was refined and temperature-decreased, in the same manner as in Example 1, followed by starting of causing the molten glass to flow out. A gas discharged from the crucible was cleaned through a filter and discharged to an outside.

The thus-obtained molten glass was cast into a mold made of carbon and the resultant glass was allowed to cool to a glass transition temperature. Immediately thereafter the glass was placed in an annealing furnace, annealed at a temperature around the glass transition temperature for 1 hour and gradually cooled to room temperature. In this manner, optical glasses Nos. 12 and 13 shown in Table 3 were obtained. Table 3 shows glass the transition temperatures (Tg) of the optical glasses Nos. 12 and 13 and transmittances thereof at a typical wavelength. The transmittance refers to a value obtained when an optical glass having a certain thickness exhibits a transmittance of 50% at a wavelength of 615 nm. The above thickness of the optical glass No. 12 was 1.0 mm, and the above thickness of the optical glass No. 13 was 0.45 mm. In addition, the transmittance measurement was carried out with a spectrophotometer with regard to samples having the form of a flat plate each and having opposed two surfaces optically polished.

With regard to the optical glasses Nos. 12 and 13, the values of $nd^{(2)}-nd^{(1)}$ were smaller than 0.00300 and the absolute values of $nd^{(2)}-nd^{(1)}$ were also smaller than 0.00300.

TABLE 3

| | 12 | 13 |
|---|---|---|
| Cationic % | | |
| $P^{5+}$ | 27.8 | 28.8 |
| $Al^{3+}$ | 18.2 | 13.9 |
| $Li^+$ | 20.4 | 23.3 |
| $Na^+$ | 0.0 | 7.4 |
| $K^+$ | 0.0 | 0.0 |
| $R^+$ | 20.4 | 30.7 |
| $Mg^{2+}$ | 6.0 | 3.1 |
| $Ca^{2+}$ | 9.4 | 6.5 |
| $Sr^{2+}$ | 10.9 | 4.7 |
| $Ba^{2+}$ | 6.1 | 4.0 |
| $R^{'2+}$ | 32.4 | 18.3 |
| $Zn^{2+}$ | 0.0 | 5.3 |
| $R^{''2+}$ | 32.4 | 23.6 |
| $Y^{3+}$ | 0.0 | 0.0 |
| $Cu^{2+}$ | 1.2 | 3.0 |
| Total | 100.0 | 100.0 |

TABLE 3-continued

|  | 12 | 13 |
|---|---|---|
| Anionic% | | |
| $F^-$ | 48.4 | 40.9 |
| $O^{2-}$ | 51.6 | 59.1 |
| Total | 100.0 | 100.0 |
| $nd^{(1)}$ | 1.51314 | 1.52115 |
| Glass transition temperature (Tg)) (° C.) | 370 | 330 |
| Transmittance (%) | | |
| 400 nm | 88 | 85 |
| 500 nm | 91 | 90 |
| 600 nm | 64 | 59 |
| 615 nm | 50 | 50 |
| 700 nm | 10 | 7 |
| 800 nm | 2 | 1 |
| 900 nm | 2 | 1 |
| 1000 nm | 5 | 3 |
| 1100 nm | 10 | 9 |
| 1200 nm | 19 | 19 |
| Thickness (mm) | 1.0 | 0.45 |

(Notes)
$R^+$ stands for a total content of $Li^+$, $Na^+$ and $K^+$.
$R^{2+}$ stands for a total content of $Mg^{2+}$, $Ca^{2+}$, $Sr^{2+}$ and $Ba^{2+}$.
$R''^{2+}$ stands for a total content of $R^{2+}$ and $Zn^{2+}$.

Comparative Example 1

Glass raw materials were melted so as to obtain a glass of Comparative Example 1 shown in Table 4 without causing any dry inert gas to flow in a crucible. Further, a continuous melting furnace having a volume of 50 liters was used. The melting temperature was set a 1,100° C. and the glass was allowed to reside in the furnace for 20 hours after the melting was started and before the molten glass was caused to flow out. When a glass was produced from the thus-prepared molten glass in the same manner as in the above procedures, $nd^{(2)}$ was greatly increased relative to $nd^{(1)}$ and the absolute value of $nd^{(2)}-nd^{(1)}$ was greater than 0.00300 as shown in Table 4.

TABLE 4

|  | Comparative Example 1 |
|---|---|
| (Cationic %) | |
| $P^{5+}$ | 28.0 |
| $Al^{3+}$ | 21.0 |
| $Li^+$ | 0.0 |
| $Na^+$ | 0.0 |
| $K^+$ | 0.0 |
| $R^+$ | 0.0 |
| $Mg^{2+}$ | 8.0 |
| $Ca^{2+}$ | 14.0 |
| $Sr^{2+}$ | 16.0 |
| $Ba^{2+}$ | 12.0 |
| $R^{2+}$ | 50.0 |
| $Y^{3+}$ | 1.0 |
| Total | 100.0 |
| (Anionic %) | |
| $F^-$ | 63.0 |
| $O^{2-}$ | 37.0 |
| Total | 100.0 |
| $nd^{(1)}$ | 1.49644 |
| $nd^{(2)}$ | 1.50308 |
| $nd^{(2)} - nd^{(1)}$ | 0.00664 |
| $nd^{(2)} - nd^{(1)}$ | 0.00664 |
| Abbe's number (vd) | 81.6 |
| Glass transition temperature (° C.) | 455 |

(Notes)
$R^+$ stands for a total content of $Li^+$, $Na^+$ and $K^+$.
$R^{2+}$ stands for a total content of $Mg^{2+}$, $Ca^{2+}$, $Sr^{2+}$ and $Ba^{2+}$.

Example 3

Preparation Example of Preform

Precision press-molding preforms were produced from molten glasses of the optical glasses Nos. 1 to 11 and the glass of Comparative Example 1 as follows. A molten glass was caused to flow, at a constant rate, out of a pipe made of platinum that was temperature-adjusted to a temperature range in which the molten glass was stably flowable without any devitrification of the glass, and a molten glass gob having a weight of an intended preform was separated by a dropping method or a method in which the leading end of the molten glass flow was supported with a support and the support was rapidly moved downward to separate a glass gob. Then, the molten glass gob was received with a receiving mold having a gas ejection port in a bottom and shaped into a preform while the glass gob was floated by ejecting a gas from the gas ejection port. The thus-obtained preforms had the form of a sphere or a compressed sphere by adjusting or setting the interval of molten glass gob separation. The thus-obtained preforms had weights accurately equivalent to values set, and the entire surface of each was a smooth surface formed by solidification of the glass in a molten state.

Then, the insides of the preforms were observed. No striae were found in the optical glasses Nos. 1 to 11 of the present invention, while clear striae were spokewise found on the surface of the glass of Comparative Example 1.

Separately, preforms were produced from the molten glasses as follows. A molten glass was cast into a casting mold and shaped into a plate-like glass or a circular rod-like glass while the cooling of the glass was promoted by blowing a dry gas on to the glass surface, and the shaped glass was annealed and then cut to obtain a glass piece. The cut piece was ground and polished to obtain a preform of which the entire surface was smooth. In this case, no striae were found on the surfaces of the thus-obtained plate-like glasses or circular rod-shaped glasses obtained by casting the molten glasses obtained by replacing the atmosphere, while striae were found on the surfaces of glasses obtained without replacing the atmosphere.

Example 4

Preparation Example of Optical Element

Preforms formed of the optical glasses Nos. 1 to 11, obtained in Example 3, were precision press-molded with a pressing apparatus shown in FIG. 1 to give aspherical lenses. Specifically, a press mold having an upper mold member 1, a lower mold member 2 and a sleeve 3 was provided, and a preform 4 was set between the lower mold member 2 and the upper mold member 1. Then, a nitrogen atmosphere was provided inside a quartz tube 11, and a heater 12 was powered to heat the interior of the quartz tube 11. The temperature inside the press mold was set at a temperature at which the glass to be molded exhibited a viscosity of $10^8$ to $10^{10}$ dPa·s, and while this temperature was maintained, a pressing rod 13 was moved downward to press the upper mold member 1 to press the preform set in the mold. The pressing was carried out at a pressure of 8 MPa for a press time period of 30 seconds. Then, the pressure for the pressing was removed, and while the glass molded product obtained by press molding was in contact with the lower mold member 2 and the upper mold 1, it was gradually cooled to a temperature at which the glass exhibited a viscosity of at least $10^{12}$ dPa·s. Then, the glass molded product was rapidly cooled to room temperature and then taken out of the mold to give an aspherical lens. The aspherical lenses obtained in the above manner had remarkably high surface accuracy.

In FIG. 1, reference numeral 9 indicates a support rod, 10 indicates a lower mold member and sleeve holder and 14 indicates a thermocouple.

An anti-reflection film was formed on each of the aspherical lenses obtained by the precision press-molding as required.

Example 5

Preparation Example of Optical Element

Preforms formed of the optical glasses Nos. 1 to 11, obtained in Example 3, were precision press-molded by the following method different from the method in Example 4. In this method, first, a preform was pre-heated to a temperature at which the glass constituting the preform exhibited a viscosity of $10^8$ dPa·s while the preform was floated. Separately, a press mold having an upper mold member, a lower mold member and a sleeve was heated to a temperature at which the glass constituting the above preform exhibited a viscosity of $10^9$ to $10^{12}$, and the above pre-heated preform was introduced into a cavity of the press mold and precision press-molded at 10 MPa. Concurrently with the start of the pressing, the cooling of the glass and the press mold was started, and the cooling was continued until the molded glass had a viscosity of at least $10^{12}$ dPa·s. Then, a molded product was taken out of the mold to give an aspherical lens. Aspherical lenses in the above manner had remarkably high surface accuracy.

An anti-reflection film was formed on each of the aspherical lenses obtained by the precision press-molding as required. In the above manner, optical elements formed of the optical glasses having high internal quality were highly productively and highly accurately produced.

Example 6

Preparation Example of Plate-like Glass and Optical Element

Each of molten glasses of the optical glasses Nos. 1 to 11 was continuously cast from a pipe into a mold separately and shaped into a plate-like glass in a dry nitrogen atmosphere, and the shaped glass was gradually cooled. When an inside of each of these glasses was observed, no striae were found.

Then, the above plate-like glasses were cut, ground and polished to prepare press-molding materials. These materials were softened under heat and press-molded to obtain optical element blanks. The blanks were gradually cooled, ground and polished to give spherical lenses.

An anti-reflection film may be formed on each of the above optical elements or a near infrared reflecting film may be coated on each of them.

Example 7

Preforms, plate-like glasses and circular rod-shaped glasses formed of the above optical glasses Nos. 12 and 13 were prepared by the methods described in above Examples 3, 6, and the like. Then, the plate-like glass formed of the optical glass No. 12 was sliced and processed in the form of a flat plate, and main surfaces which were in parallel with each other were optically polished to obtain a 1.0 mm thick near infrared absorbing filter. The thus-obtained near infrared absorbing filter was attached to a quartz flat plate (whose main surfaces in parallel with each other were optically polished) and two flat plates of an optical glass (borosilicate glass BK-7)), to produce a composite filter having both the function of a near infrared absorbing filter and the function of a low-pass filter, the composite filter being to be incorporated into an image-sensing device.

Similarly, the plate-like glass formed of the optical glass No. 13 was sliced and both surfaces of an obtained glass piece were optically polished to obtain a 0.45 mm thick flat plate. This flat plate was attached to a quartz flat plate and an optical glass (borosilicate glass) plate to obtain a composite filter.

Composite filters may be obtained by slicing the circular rod-shaped glasses formed of the optical glass No. 12 or 13, optically polishing both surfaces of the thus-obtained glass piece and stacking the resultant flat plate, a quartz flat plate and an optical glass (borosilicate glass BK-7) flat plate.

Then, the preforms formed of the optical glasses Nos. 12 and 13 were precision press-molded to give aspherical lenses having the function of near infrared absorption.

Various optical elements obtained by the above methods were all optically uniform and were free of striae.

Industrial Utility

According to the present invention, there can be obtained a fluorine-containing optical glass free of striae. And, there can be obtained an optical glass having the property of low dispersion, having a low glass transition temperature and having the property of being softened at a low temperature so that precision press-molding is carried out, and precision press-molding preforms and optical elements such as various lenses can be produced from the above optical glass.

The invention claimed is:

1. A process for producing an optical element, which comprises machining a glass shaped material formed of an optical glass that is a fluorine-containing glass that exhibits a transmittance except for reflection loss at a sample surface, measured in a sample 10 mm thick having two flat surfaces parallel with each other at a wavelength of 400 nm to 2,000 nm, of 80% or more, and has a refractive index nd(1), wherein the absolute value of nd(2)–nd(1) is 0.00300 or less, said refractive index nd(2) being a refractive index of the fluorine-containing glass after the fluorine-containing glass is re-melted in a nitrogen atmosphere at 900° C. for 1 hour, cooled to its glass transition temperature and then cooled to 25° C. at a temperature decrease rate of 30° C./hour.

2. The process for producing an optical element as recited in claim 1, wherein the fluorine-containing glass is a fluorophosphate glass.

3. The process for producing an optical element as recited in claim 2, wherein the fluorophosphate glass comprises, by cationic %, 5 to 50% of $P^{5+}$,
0.1 to 40% of $Al^{3+}$,
0 to 20% of $Mg^{2+}$,
0 to 25% of $Ca^{2+}$,
0 to 30% of $Sr^{2+}$,
0 to 30% of $Ba^{2+}$,
0 to 30% of $Li^+$,
0 to 10% of $Na^+$,
0 to 10% of $K^+$,
0 to 10% of $Y^{3+}$, 0 to 5% of $La^{3+}$ and
0 to 5% of $Gd^{3+}$.

4. The process for producing an optical element as recited in claim 2, wherein the molar ratio of content of $F^-$ to the total content of $F^-$ and $O^{2-}$ in the fluorophosphate flass, $F^-/(F^- + O^{2-})$, is from 0.25 to 0.95.

5. The process for producing an optical element as recited in claim 3, wherein the fluorophosphate glass contains 2 to 30 cationic % of $Li^+$.

6. The process for producing an optical element as recited in claim 1, wherein the fluorine-containing glass has a refractive index $nd^{(1)}$ of 1.40000 to 1.60000 and an Abbe's number (vd) of 67 or more.

* * * * *